P. DAIMLER.
GEARING.
APPLICATION FILED OCT. 25, 1906.
994,130.
Patented June 6, 1911.
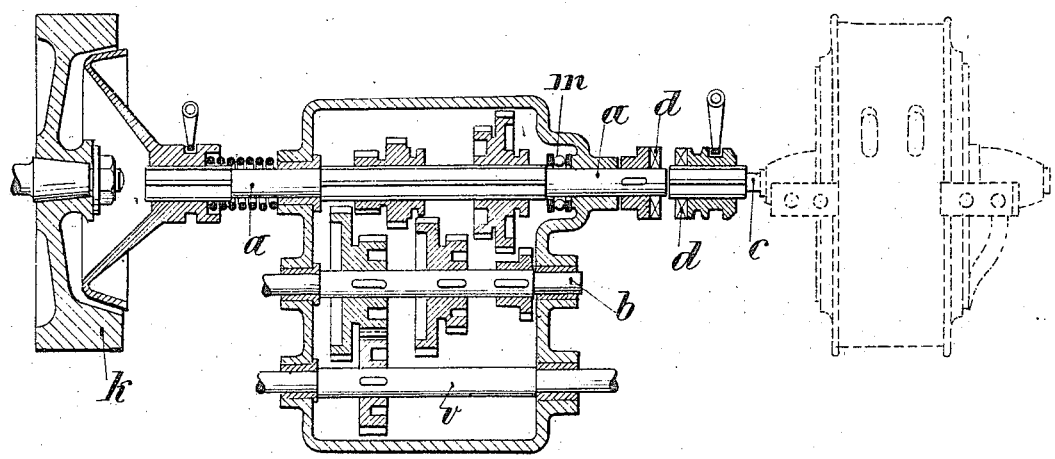
Witnesses.
Alfred Bosshardt
Stanley Bramall
Inventor.
Paul Daimler.
Per F. Bosshardt.
Attorney

UNITED STATES PATENT OFFICE.

PAUL DAIMLER, OF UNTERTÜRKHEIM, GERMANY.

GEARING.

994,130.

Specification of Letters Patent.  Patented June 6, 1911.

Application filed October 25, 1906.  Serial No. 340,549.

*To all whom it may concern:*

Be it known that I, PAUL DAIMLER, citizen of the Empire of Germany, residing at Untertürkheim, in the Kingdom of Würtemberg, Germany, have invented certain new and useful Improvements in Gearing, of which the following is a specification, reference being had therein to the accompanying drawing.

This invention relates to improvements in that type of motor fire engines, motor illuminating cars and the like in which when the car stands still the motor drives the fire engine, dynamo or the like.

The object of this invention is chiefly to transmit the power from the first shaft of the speed changing mechanism to the pump or dynamo or the like shaft in a more advantageous manner than hitherto has been the case and to permit of connecting the pump, dynamo or the like without the necessity of first stopping the car motor. I attain these objects by the mechanism illustrated in the accompanying drawing, which latter represents a vertical section of the speed changing gear.

$a$ is the uppermost or first shaft of the speed changing mechanism in alinement with the motor shaft and driven in the usual manner from the motor shaft by means of the friction coupling $k$ arranged on the fly wheel. Below this uppermost or first shaft is situated the second shaft $b$ driven from the shaft $a$ at variable speeds and which imparts motion to a third shaft $v$ which drives the front wheels and the back wheels of the vehicle.

The shaft $c$ carrying the dynamo armature or the like is mounted in alinement with the top shaft $a$ of the speed changing mechanism so as to permit of connecting them together by a clutch coupling, the employment of which at one end of the shaft $a$ being facilitated by using a ring bearing $m$ instead of a step bearing as hitherto for taking up the thrust of the friction cone coupling Another advantage resulting from the arrangement described is that the third shaft $v$ of the speed changing mechanism remains free in both directions for driving the front or back wheel of the car.

In order to permit of throwing into engagement the coupling $d$ between the dynamo or the like shaft $c$ and the first shaft $a$ of the speed changing mechanism, the latter is first moved into its middle position, so that the respective bottom shaft $b$ is completely disengaged and the top shaft $a$ is rotated by the friction coupling $k$; the latter is then slightly disengaged so that the shaft $a$ still rotates a little and at the same time the clutch coupling $d$ thrown into engagement. If the members of the friction coupling $k$ are then again thrown into operative position, the pump, dynamo or the like shaft $c$ is driven through the medium of the shaft $a$ and the coupling $d$ by the friction coupling $k$ mounted on the main shaft of the motor, without the necessity of first stopping the motor.

I claim:

In a motor vehicle, a speed changing mechanism comprising a first and a second shaft, a shaft arranged in alinement with the first shaft of the speed changing mechanism for driving a machine mounted on the said vehicle, a clutch coupling between the adjacent ends of the said shafts for connecting them together, and a third shaft situated below the second shaft of the speed changing mechanism, the said third shaft extending in both directions, gear wheels on the said motion shafts for transmitting rotary motion from the first to the second and from the latter to the third motion shaft, all combined substantially as and for the purpose set forth.

In testimony whereof I hereunto affix my signature in presence of two witnesses.

PAUL DAIMLER.

Witnesses:
 ROBERT UPLAND,
 ERNST ENTENMANN.